United States Patent [19]

Kirchoff

[11] 4,360,223
[45] Nov. 23, 1982

[54] LOW MOUNT, EASILY ASSEMBLED, AIR BAG PASSIVE RESTRAINT MODULE

[75] Inventor: George F. Kirchoff, Brigham City, Utah

[73] Assignee: Thiokol Corporation, Newtown, Pa.

[21] Appl. No.: 247,705

[22] Filed: Mar. 26, 1981

[51] Int. Cl.³ .............................................. B60R 21/10
[52] U.S. Cl. .................................. 280/729; 280/732; 280/742; 280/743
[58] Field of Search ............... 280/729, 732, 736, 739, 280/742, 743

[56] References Cited

U.S. PATENT DOCUMENTS

| | | | |
|---|---|---|---|
| 3,473,824 | 10/1969 | Carey | 280/729 |
| 3,610,657 | 10/1971 | Cole | 280/150 |
| 3,622,176 | 11/1971 | Byer | 280/732 |
| 3,733,091 | 5/1973 | Fleck | 280/729 |
| 3,761,111 | 9/1973 | Kemper | 280/150 |
| 3,767,225 | 10/1973 | Mazelsky | 280/150 |
| 3,768,830 | 10/1973 | Hass | 280/150 |
| 3,784,225 | 1/1974 | Fleck et al. | 280/150 |
| 4,076,277 | 2/1978 | Kuwakado et al. | 280/738 |
| 4,296,084 | 10/1981 | Adams et al. | 423/351 |

OTHER PUBLICATIONS

Automotive Engineering, vol. 88, No. 2, Feb., 1980, NY, USA.

Primary Examiner—Robert R. Song
Attorney, Agent, or Firm—Gerald K. White

[57] ABSTRACT

A low-mount, air bag module for the passenger side of an automobile uses two bags that are folded within a housing that is open at one end. One of the bags is for restraining the knees of the passenger to prevent forward sliding in the event of a crash, the other bag being for restraining the torso. The knee bag is inside the torso bag and they are both attached directly to the inflator, the knee bag being arranged to be inflated first. The torso bag then is inflated to prevent forward rotation of the passenger from the hips.

15 Claims, 5 Drawing Figures

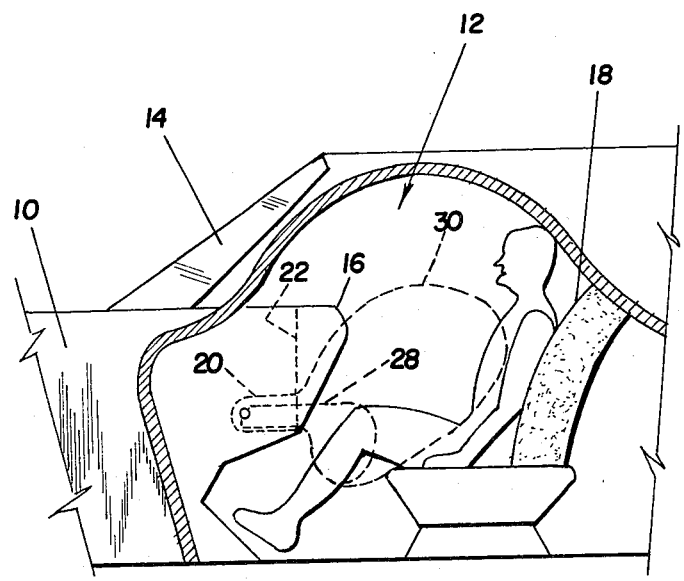
Fig. 1
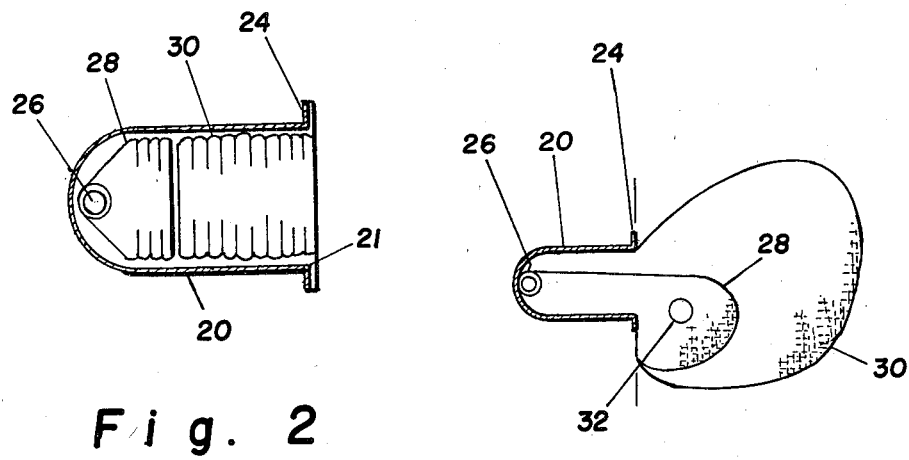
Fig. 2
Fig. 3

LOW MOUNT, EASILY ASSEMBLED, AIR BAG PASSIVE RESTRAINT MODULE

BACKGROUND OF THE INVENTION

1. Field of the Invention

The present invention relates to an automotive vehicle inflatable cushion restraint that momentarily and temporarily restrains an occupant during the critical instant of a collision impact. More particularly, the invention relates to a low mount, easily assembled, dual air bag restraint module for the passenger side of an automobile.

2. Description of the Prior Art

Occupant restraint systems for automotive vehicles, including low-mount dual air bag modules, have been proposed in the prior art. One such arrangement, as disclosed in U.S. Pat. No. 3,610,657, granted on Oct. 5, 1971, uses two bags that are folded within a housing that is open at one end. One of the bags is for restraining the knee of the passenger to prevent forward sliding in the event of a crash. The other bag is for restraining the passenger's torso. The knee bag is located within the torso bag and both are attached directly by a manifold to an inflator. The knee bag is arranged to be inflated first. Then the torso bag is inflated to prevent forward rotation of the passenger from the hips.

There are practical problems with such prior art air bag modules. Such problems include:

(1) the need for complex hardware for attaching the air bags to the inflator;
(2) there is a tendency for the inflating gas to burn the torso bag;
(3) the necessity for protective components for the prevention of such burning;
(4) the difficulty in proportioning the inflating gases to the two bags.

Other prior U.S. patents that disclose dual bag constructions that are also subject to one or more of the foregoing problems or that are otherwise undesirably expensive to make and difficult to assemble are U.S. Pat. Nos. 3,761,111, 3,784,225, 4,076,277, and 3,767,225.

SUMMARY OF THE INVENTION

An object of the invention is to provide an improvement in low-mount dual air bag modules for the passenger side of automotive vehicles that overcomes the aforementioned problems of the prior art proposals.

A more specific object of the invention is to provide such a low-mount module including a knee bag and a torso bag and in which the torso bag cannot be burned so that there is no need for protective components, in which there is no need for a gas distributor or proportioning device between the two bags and the inflator, and in which the module is less expensive to make and easier to assemble.

In accomplishing the foregoing and other objectives, there is provided, according to the invention, an air bag module for the passenger side of an automobile comprising a housing that is open at one end, within which housing a first bag, a knee bag and a second bag, a torso bag are separately folded, with the torso bag attached to a mounting flange that is provided at the open end of the housing, and the knee bag attached to and in communication with an inflator that is located in the housing at the closed end thereof. This arrangement takes advantage of the fact that the torso bag can be inflated after the knee bag has been inflated, such inflation of the torso bag being effected by gases passing through the knee bag. Further, in accordance with the invention, a pressure responsive orifice means is provided in a second opening in the wall of the knee bag. This orifice means controls the flow of gas through the opening in the wall of the knee bag thereby to insure a predetermined gas pressure within the knee bag, while permitting subsequent inflation of the torso bag by gases passing into the torso bag through the orifice means.

The foregoing objects and other objects, features and advantages of the present invention will become more apparent from the following description of a preferred embodiment taken in conjunction with the accompanying drawing.

BRIEF DESCRIPTION OF THE DRAWING

FIG. 1 is a schematic view, partly in section, of an embodiment of the invention as installed in an automotive vehicle and showing in phantom, the torso and knee bags fully expanded and inflated;

FIG. 2 is a side view, partly in section, of the low-mount air bag passive restraint module of the present invention showing the separate torso and knee bags folded within a housing having an open end;

FIG. 3 is a side view, partly in section, of the module of FIG. 2 showing the torso and knee bags fully expanded and inflated;

DESCRIPTION OF THE PREFERRED EMBODIMENT

Figure 4:
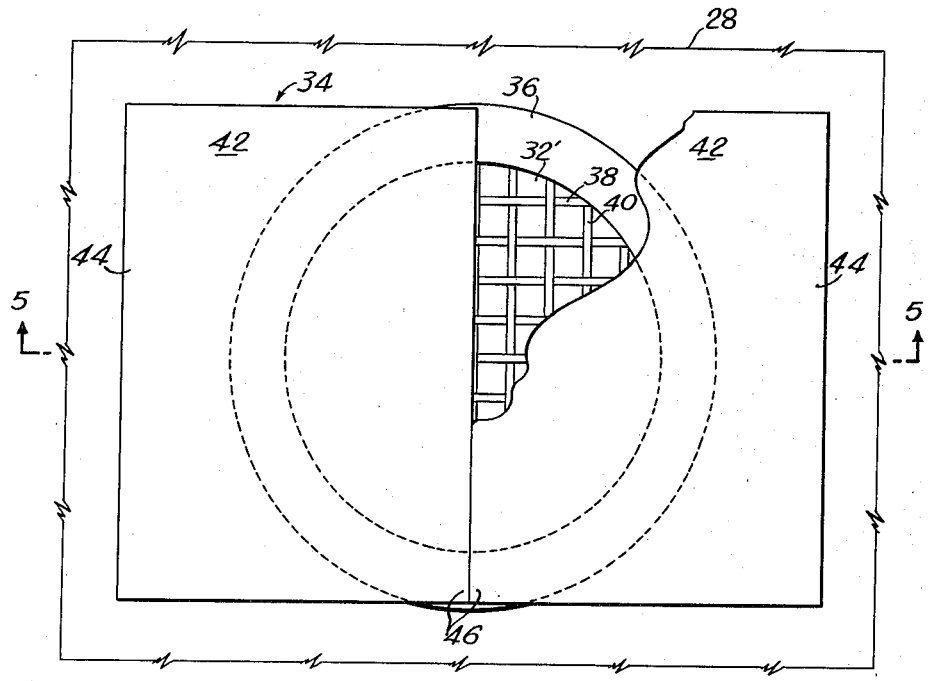
FIG. 4 is an enlarged view of a preferred embodiment of a check valve means in the knee bag.

In FIG. 1 there is illustrated an automobile body 10 having a compartment 12 that is defined, in part, by a windshield 14 and an instrument panel 16, and in which a front seat 18 is installed. A housing 20 having an open end 21 is mounted under the instrument panel 16. The outline of the open end 21 of housing 20 may be circular or elliptical, as desired. The housing 20 is flush mounted on a base wall 22 of the instrument panel 16 by a mounting flange 24. Flange 24 desirably is integral with housing 20 and forms a rim around the open end 21 thereof, as best seen in FIG. 2.

Located within housing 20, adjacent the closed end thereof and suitably mounted therein, as seen in FIG. 2, is a nitrogen gas generator or inflator 26. The gas generator 26 may be of any suitable type, one desirable type being that illustrated and described in application Ser. No. 88,992, filed on Oct. 29, 1979 by Gary V. Adams and Fred E. Schneiter. Gas generator 26 is operatively coupled to a suitable sensor (not shown) that is arranged to sense crash impacts of a vehicle from a speed, typically of 12–15 miles per hour or greater. Such impacts activate the gas generator 26 for the production of nitrogen gas. Housing 20 is made of material that is impervious to nitrogen and is designed to withstand the high gas pressures that are produced.

Also mounted within the housing 20 is a first air bag, a knee bag, that is indicated at 28 and a second air bag, a torso bag, that is indicated at 30. In their normal orientation, prior to activation of the gas generator 26, the knee bag 28 and torso bag 30 are folded adjacent to each other, as shown in FIG. 2, with the knee bag 28 adjacent the closed end of housing 20. The knee bag 28 is attached to and is in direct gas tight communication at a first opening in the wall thereof with the discharge ports or outlets of the generator 26.

The torso bag 30 is attached in gas tight manner to the mounting flange 24, there being no direct communication between the torso bag 30 and the discharge ports of the gas generator 26. The closed ends of the knee bag 28 and torso bag 30, when folded, as shown in FIG. 2, are disposed adjacent each other.

Desirably, the knee bag 28 and torso bag 30 are each made of neoprene coated rib stock nylon sheet, the seams of which are suitably sewed and sealed with silicone rubbers. Either or both of the bags 28 and 30 may be porous, so that they become deflated shortly after their intended functions have been accomplished. Also, other materials, such as polyesters, may be used for their manufacture.

As illustrated in FIG. 3, a pressure responsive orifice means 32 is provided in a second opening in the wall of the knee bag 28. This orifice 32 controls the flow of gas through such opening and insures a predetermined gas pressure within knee bag 28 while permitting subsequent inflation of torso bag 30 by gases passing through the knee bag 28 and the orifice means 32.

In a typical time and pressure sequence for inflation of the bags 28 and 30, the knee bag 28 is inflated to a pressure of about 8 to 10 psig within 10 to 15 milliseconds of impact by gases from the inflator 26; and the torso bag 30 is inflated to a pressure of 1 to 2 psig within 35 to 40 milliseconds of impact by gases passing through the pressure responsive orifice means 32 in the knee bag 28.

Hence, it can be seen that, in designs of the invention wherein complete inflation of the torso bag 30 requires more time than is needed for the knee bag 28 to perform its function of restraining the vehicle passenger's knees, the pressure responsive orifice means 32 in the knee bag 28 can be a simple orifice, as shown in FIG. 3. The size of this orifice 32 is determined primarily by the rate at which gas is produced by the inflator 26 and by the desired gas pressure within the knee bag 28.

Figure 5:
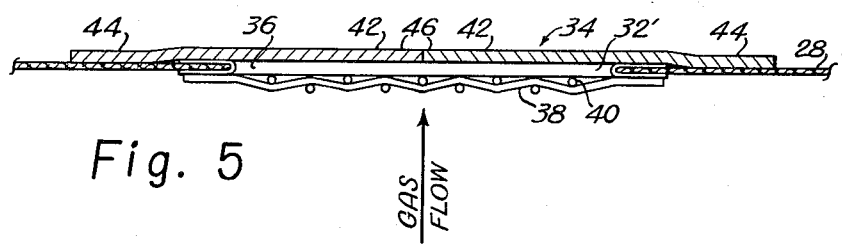
FIG. 5 is a sectional view taken on line 5—5 of FIG. 4.

In other designs of the invention, it is desirable to use a check valve 34, shown in FIGS. 4 and 5, as the means for discharging gas from the knee bag 28 into the torso bag 30. This can assure that a predetermined gas pressure can be maintained within the knee bag 28 during its entire function time, regardless of the stage of inflation of the torso bag 30. The preferred check valve 34 has a circular orifice 32' having reinforced edges 36 formed in the material of the knee bag 28. The orifice 32' is further reinforced by two sets of strands 38 and 40 of nylon or other high-tensile-strength material arranged at right angles to one another, each strand being fastened at its end to the reinforced edges 36 of the orifice 32'. The strands 38 and 40 are preferably fastened together at their intersections by bonding or welding.

Two flat panels or flaps 42 cover the orifice 32', their outer edge portions 44 being fastened to the outside of the knee bag 28 by sewing or bonding and their inner edges 46 being in contact with one another at the approximate center of the orifice 32'. The flaps 42 are preferably made of a resilient plastic material, such as polypropylene, and are spring biased toward the orifice 32' to contain a predetermined threshold of gas pressure within the knee bag 28 before bending outwardly to permit passage of gas into the torso bag 30. Alternative to using flaps 42 made of material wherein the spring biasing is an inherent property thereof, actual springs, not shown, could be attached to the flaps 42 and to the knee bag 28 for the required spring biasing.

The mode of operation of the low-mount air bag restraint module of the present invention will now be described. In the event of a collision, and in response to a signal from the impact sensor, the gas generator or inflator 26 is activated. Gas at high pressure generated by inflator 26 then inflates and expands knee bag 28. When the knee bag 28 is inflated, it functions, initially as a deployment cushion as it moves the torso bag outwardly from the housing and the instrument panel 16 into the compartment 12 of the vehicle 10. The inflated knee bag further functions as a knee cushion when engaged by the knees of a seated vehicle occupant and prevents the occupant's knees from bumping against instrument panel 16 or the undersurface thereof. The inflated knee bag 28 also prevents forward sliding of the vehicle occupant. Subsequently, upon the development of the predetermined pressure in the knee bag 28, as determined by the check valve 32, gas flows out of knee bag 28 through check valve 32 into torso bag 30 to inflate and expand the latter. Such inflation and expansion of torso bag 30 prevents forward rotation of the occupant from the hips. The knee bag 28 and the torso bag 30 remain inflated during the function time to maintain the occupant seated in the vehicle.

It is evident from the foregoing explanation that the present invention takes advantage of the fact that the torso bag 30 can be inflated after the knee bag 28 so that the torso bag 30 can be inflated by gases passing through the knee bag 28. Since the torso bag 30 is not exposed directly to the gas as generated by gas generator 26, being inflated by gases that have passed through the knee bag 28, knee bag 28 provides a desirable heat and kenetic energy absorption effect that prevents or at least minimizes burning of the torso bag 30.

Thus, there has been provided, according to the present invention, a low-mount, easily assembled, air bag passive restraint module comprising a knee air bag 28 and a torso air bag 30 wherein the torso bag cannot be burned so that protective components for the torso bag required in prior art air arrangements are eliminated. Additionally, there is no need for a gas manifold or distributor or other proportioning device between the knee bag 28 and the torso bag 30 and the gas generator or inflator 26. Furthermore, the module of the present invention is much less expensive and easier to assemble than the structures that have been proposed in the prior art.

What is claimed is:

1. An air bag module for an automotive vehicle comprising, a housing having a closed end and an open end, a flange on the open end of said housing, foldable first bag means normally folded in said housing adjacent the closed end and having first and second openings to the interior thereof, the first of the openings being adapted for connection to a source of gas for the inflation of said first bag means, pressure responsive orifice means associated with the second opening of said first bag means for controlling gas flow outwardly of said first bag means through the second opening, and, foldable second bag means normally folded in said housing between the open end thereof and said first bag means, said second bag means having an opening that is attached in gas sealing relation to said flange.

2. A module as specified in claim 1 further including a gas generator having gas discharge ports and located in the closed end of said housing, the first opening of said first bag means being connected in communication with the gas discharge ports of said gas generator.

3. A module as specified in claim 2 wherein said first bag means, when inflated by gas generated by said gas generator, initially functions as a deployment cushion to move said second bag means outwardly from said housing.

4. A module as specified in claim 3 wherein said first bag means further functions when inflated, as a knee cushion that is adapted for engagement by the knees of an occupant seated in the vehicle.

5. A module as specified in claim 4 wherein said second bag means is inflated by gases passing through said first bag means and said pressure responsive orifice means upon the attainment of a predetermined gas pressure in said first bag means, said second bag means functioning, when inflated, as a torso bag to prevent forward rotation of the occupant from the hips, said first bag means and the second bag means remaining inflated during the function time to maintain the occupant in a seated position.

6. A module as specified in claim 1 wherein the pressure responsive orifice means comprises an orifice in said first bag means and wherein the size of said orifice is determined to maintain approximately a selected gas pressure within said first bag means for the duration of its function time.

7. A module as specified in claim 1 wherein the pressure responsive orifice means is a check valve means.

8. A module as specified in claim 7 wherein said check valve means comprises:
at least one flat, thin flap arranged to cover said second opening in said first bag means, one edge of said flap being attached to the outside surface of said first bag means adjacent said second opening therein; and
spring means for biasing said flap toward said second opening with sufficient force to resist a predetermined gas pressure within said first bag means and to permit passage of gas through said second opening when pressure thereof exceeds said predetermined value.

9. A module as specified in claim 8 wherein said spring means is a property of the material from which said flap is made.

10. A module is specified in claim 9 wherein said flap is made of polypropylene.

11. A module as specified in claim 8 wherein there are two of said flaps, each having an inner edge in contact with that of the other, over the approximate center of said second opening, and an outer edge fastened to said first bag means adjacent said second opening.

12. A module as specified in claim 8 wherein said second opening in said first bag means has reinforced edges; and further includes two sets of parallel strands at right angles to one another, each end of each strand being attached to said reinforced edge of said second opening for further reinforcement thereof.

13. A module as specified in claim 12 wherein said strands are fastened together at their intersections.

14. A module as specified in claim 12 wherein said strands are made of nylon.

15. An air bag module for an automotive vehicle comprising:
a housing having a closed end and an open end,
a flange on the open end of said housing,
foldable first bag means normally folded in said housing adjacent the closed end and having first and second openings to the interior thereof, the first of the openings being adapted for connection to a source of gas for the inflation of said first bag means,
check valve means for controlling gas flow outwardly of said first bag means through the second opening, and
foldable second bag means normally folded in said housing between the open end thereof and said first bag means, said second bag means having an opening that is attached in gas sealing relation to said flange,
wherein said first bag means when inflated initially functions as a deployment cushion to move said second bag means outwardly of said housing, and then functions as a knee cushion that is adapted for engagement by the knees of an occupant seated in the vehicle, and
wherein said second bag means is inflated by gases passing through said first bag means and said check valve means upon the attainment of a predetermined gas pressure in said first bag means, said second bag means functioning when inflated as a torso bag to prevent forward rotation of the occupant from the hips, the first bag means and said second bag means remaining inflated during the function time to maintain the occupant in a seated position.

* * * * *